(12) United States Patent
Dubreuil et al.

(10) Patent No.: US 12,347,437 B2
(45) Date of Patent: Jul. 1, 2025

(54) METHOD FOR PROCESSING A PAYMENT TRANSACTION, AND CORRESPONDING DEVICE, SYSTEM AND PROGRAMS

(71) Applicant: BANKS AND ACQUIRERS INTERNATIONAL HOLDING, Paris (FR)

(72) Inventors: Arnaud Dubreuil, Paris (FR); Quiterie D'Avout, Paris (FR); Pierre Quentin, Enghien les Bains (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 282 days.

(21) Appl. No.: 17/432,711

(22) PCT Filed: Feb. 20, 2020

(86) PCT No.: PCT/EP2020/054500
§ 371 (c)(1),
(2) Date: Aug. 20, 2021

(87) PCT Pub. No.: WO2020/169741
PCT Pub. Date: Aug. 27, 2020

(65) Prior Publication Data
US 2022/0199092 A1    Jun. 23, 2022

(30) Foreign Application Priority Data

Feb. 22, 2019  (FR) ...................................... 1901811

(51) Int. Cl.
*G10L 17/04* (2013.01)
*G06Q 20/40* (2012.01)
(Continued)

(52) U.S. Cl.
CPC ........ *G10L 17/04* (2013.01); *G06Q 20/40145* (2013.01); *G10L 17/02* (2013.01);
(Continued)

(58) Field of Classification Search
CPC .......... G10L 17/04; G10L 17/14; G10L 17/24
See application file for complete search history.

(56) References Cited

U.S. PATENT DOCUMENTS

| 7,227,930 B1 | 6/2007 | Othmer et al. |
| 2001/0016815 A1* | 8/2001 | Takahashi ............... G10L 15/26 704/235 |

(Continued)

OTHER PUBLICATIONS

International Preliminary Report on Patentability and English translation of the Written Opinion dated Aug. 10, 2021 for corresponding International Application No. PCT/EP2020/054500, Feb. 20, 2020.

(Continued)

*Primary Examiner* — Feng-Tzer Tzeng
(74) *Attorney, Agent, or Firm* — David D. Brush; Westman, Champlin & Koehler, P.A.

(57) ABSTRACT

A method for registering a user to a voice service. The method is implemented by an interface server and includes: obtaining, by using an electronic voice processing device including at least one component for capturing audio samples, at least one voice sample of the user; obtaining, from the at least one voice sample of the user, at least one information item for confirming consent of the user to the conditions for accessing the voice service; obtaining, from the voice sample, at least one information item associated with the user; and computing a reference voice print associated with the user.

5 Claims, 2 Drawing Sheets

(51) Int. Cl.
  *G10L 17/02*  (2013.01)
  *G10L 17/06*  (2013.01)
  *G10L 17/24*  (2013.01)
  *H04M 3/42*  (2006.01)
  *G10L 17/14*  (2013.01)

(52) U.S. Cl.
  CPC .............. *G10L 17/06* (2013.01); *G10L 17/24* (2013.01); *H04M 3/42153* (2013.01); *G10L 17/14* (2013.01)

(56) References Cited

U.S. PATENT DOCUMENTS

| 2002/0004831 | A1 | 1/2002 | Woodhill | |
|---|---|---|---|---|
| 2002/0111809 | A1 | 8/2002 | McIntosh | |
| 2003/0125944 | A1* | 7/2003 | Wohlsen | G10L 17/24 704/E17.016 |
| 2012/0054095 | A1* | 3/2012 | Lesandro | G06F 9/452 705/39 |
| 2013/0156166 | A1* | 6/2013 | Gilbert | H04M 3/4936 379/88.01 |
| 2016/0254000 | A1 | 9/2016 | Thalanany | |

OTHER PUBLICATIONS

European Examination Report dated Apr. 25, 2023 for corresponding parallel European Application No. 20 704 917.2.
International Search Report dated Mar. 11, 2020 for corresponding International Application No. PCT/EP2020/054500, Feb. 20, 2020.
Written Opinion of the International Searching Authority dated Mar. 11, 2020 for corresponding International Application No. PCT/EP2020/054500, filed Feb. 20, 2020.

* cited by examiner

METHOD FOR PROCESSING A PAYMENT TRANSACTION, AND CORRESPONDING DEVICE, SYSTEM AND PROGRAMS

CROSS-REFERENCE TO RELATED APPLICATIONS

This Application is a Section 371 National Stage Application of International Application No. PCT/EP2020/054500, filed Feb. 20, 2020, which is incorporated by reference in its entirety and published as WO 2020/169741 A1 on Aug. 27, 2020, not in English.

1. FIELD OF THE INVENTION

The present technique relates to the field of voice assistants allowing users to access different services via an electronic device, such as for example voice commerce services, access to cultural products (music, films . . . ), to information, appointment, contact, connected object driving services . . . .

The present technique concerns more particularly the registration (or account creation) phase of a user to such a service, before being able to access the service itself.

2. PRIOR ART

Voice assistants represent a new channel of interaction with the users and new uses of services, called voice services, such as those described above, are emerging.

In order to benefit from such services, a user must first be registered and create the voice print by sharing audio and personal data with a third party.

However, before sharing his voice and his personal data, the user must give his consent to authorize this third party to access this personal data, by accepting the "terms and conditions of use" (hereinafter noted terms and conditions) of the service in question. This procedure is called "opt-in" or consent.

Currently, in the procedure for registering to such a voice service, obtaining the consent can constitute an obstacle for the user, in terms of ergonomics. Indeed, as illustrated in [FIG. 1], the user must read the terms and conditions of use of the service, during a "READ" step then accept them via an action, during an "INPUT" step, such as a click on a button of an Internet page. The user must also input the required personal data most of the time, during a "DATA SHARING" step. Then, the user must state standard phrases, or a password, repeatedly, during an "AUDIO SHARING" step, in order to create a reference voice print, which will then be used during the access to the voice service, to identify and/or authenticate it. Thus, while a service accessible via a voice assistant provides a user with an improved user-friendly experience (for example to make quick purchases in the context of voice commerce, or to obtain information or music instantly), the registration phase remains "conventional" and not very ergonomic. It can indeed last more than 10 minutes, from the moment the user begins to read the terms and conditions of use before accepting them, via an input.

In addition, this registration phase requires most of the time two devices, when the device on which the voice assistant is installed (for example a connected speaker) does not allow the input of the consent to the terms and conditions of use of the voice service. In this case, the user must also use his smartphone, for example, the latter should be paired with the voice assistant device.

Therefore, there is a need, from the users, to be easily and quickly informed of the terms and conditions of use of such a voice service and to have a user-friendly experience, which is fast and frictionless when registering to this voice service. There is also a need, from traders, to provide a simple and quick solution for registering a user to such a voice service, in particular in the context of voice commerce, so as not to "lose" potential customers from the registration phase. Moreover, the current techniques have a significant drawback in terms of security of the personal data of the users and especially of securing the registration and particularly the consent. This drawback lies in the weakness of the evidence which can be provided regarding the authentication of the user who gave his consent. However, this aspect is essential when it is then to purchase goods or services by a voice payment, that is to say when a payment transaction is authorized based on the prior consent and authentication of the concerned user.

Indeed, currently, when it is necessary to provide evidence of a consent of a user, they are computer traces which are used, in the form of log files tracing the different Internet connections of the electronic device used by the user for his consent. However, these computer traces allow identifying the device used for the consent but do not allow the authentication of the user himself. In addition, it is relatively easy to falsify such computer traces, or even to make them.

There is therefore a need for a technique of registration and consent to a service accessible via a voice assistant, or voice service, which is user-friendly, quick and secure in terms of user authentication.

3. DISCLOSURE OF THE INVENTION

The present technique proposes a method for managing the access of a user to a voice service, a method implemented by an interface server, comprising the following steps:

obtaining, via an electronic voice processing device comprising at least one component for capturing audio samples, of at least one voice sample of said user;
   obtaining, from said at least one voice sample of the user, at least one information item for validating a consent of the user to the conditions for accessing the voice service.

According to one particular feature, the registration method further comprises a step of obtaining, from said at least one voice sample of the user, at least one information item associated with the user.

Thus, the user's voice sample(s) are also used to obtain information or personal data from the user, without the user's having to input them via a device distinct from the voice processing device, or via another interface such as inputting a character for example.

According to one particular aspect, the registration method further comprises a step of computing, from said at least one voice sample of the user, a reference voice print associated with the user.

Thus, the voice sample(s) of the user are also used to compute a reference voice print associated with the user, for the subsequent authentication of the user when he wishes to access the voice service to which he has registered.

Thus, the present technique is based on a new and inventive approach to obtaining the consent of a user to the conditions for accessing and using a voice service based on the use of the voice sample acquired for his registration to the voice service (in particular during the learning phase implemented to compute his reference voice print). In this manner, obtaining a consent of a user to the conditions for accessing and using a voice service is fully voice itself, greatly improving the user experience relative to the current techniques. Indeed, according to the proposed technique, the user does not need to perform an additional action, such as for example an input (click on an "Accept" button) on a device displaying the conditions of the voice service, to give his consent, the recording of his voice when registering is sufficient.

According to one embodiment, the step of obtaining at least one information item for validating a consent of the user comprises the following sub-steps:

processing said at least one voice sample of the user delivering at least one interpretable textual information item;

interpreting said at least one interpretable textual information item delivering said least one information item for validating a consent of said user.

Thus, according to this embodiment, the voice sample(s) of the user which are captured by the voice processing device are processed so as to obtain interpretable text, which can then be compared with the terms and conditions of use of the voice service in order to determine whether the user has correctly stated his consent to these terms and conditions.

For example, the phrases stated by the user, captured by the voice processing device, are transcribed by a Speech-To-Text algorithm to deliver a text which can be compared with the text of the terms and conditions of use of the voice service.

If the user has stated the required phrases, by which he expressly adheres to the terms and conditions of use of the voice service, thereby giving his consent, the comparison is positive and the consent of the use is considered to be obtained.

If, however, the user has not correctly repeated the required phrases, the comparison is negative and consent is not obtained.

According to a particular aspect of the present technique, said at least one voice sample, from which said least one information item for validating a consent of the user is obtained, is associated with the user and saved as evidence of the consent of the user.

Thus, according to this embodiment, the voice sample, by which the user gives his consent to the terms and conditions of use of the voice service, is saved so that it can serve as subsequent legal evidence of obtaining the consent of the user. Indeed, the user's voice can authenticate him, this recording proves that it is indeed the correct user who has given their consent. It is therefore a legally strong evidence, unlike evidence consisting of computer traces used by the current techniques.

According to another aspect, the registration method comprises a step of verifying the reliability of the reference voice print with at least one second voice sample of the user.

Thus, according to this embodiment, once the reference voice print is computed for the user, from already captured audio samples, other audio samples are requested from the user so as to be ensured that the reference voice print effectively allows authenticating him.

If this was not the case, a different reference voice print is computed, from a greater number of audio samples, or a greater duration of audio samples.

This step allows optimising the user's voice learning phase at the time of his registration to the voice service, in order to make his subsequent authentication more reliable when using the service.

This technique also concerns an interface server, comprising in particular:

means for obtaining, via an electronic voice processing device comprising at least one component for capturing audio samples, of at least one voice sample of the user;

means for obtaining, from said at least one voice sample of the user, at least one information item for validating a consent of the user to the conditions for accessing a voice service.

Such an interface server is in particular capable of implementing the steps of the previously described registration method, according to the different embodiments.

Finally, the present technique concerns a computer program product downloadable from a communication network and/or stored on a computer readable medium and/or executable by a microprocessor, comprising program code instructions for the execution of a registration method as previously described, when it is executed on a computer.

According to a preferred implementation, the different steps of the methods according to the proposed technique are implemented by one or more software or computer programs, comprising software instructions intended to be executed by a data processor of an execution device according to the proposed technique and being designed to control the execution of the different steps of the methods, implemented at the communication terminal, the electronic execution device and/or the remote server, within the context of a distribution of the processes to be performed and which are determined by a source code.

Consequently, the proposed technique also aims at programs, likely to be executed by a computer or by a data processor, these programs including instructions to control the execution of the steps of the methods as mentioned above.

A program can use any programming language, and be in the form of source code, object code, or intermediate code between source code and object code, such as in a partially compiled form, or in any other desirable form.

The proposed technique also aims at an information medium readable by a data processor, and including instructions of a program as mentioned above.

The information medium can be any entity or device capable of storing the program. For example, the medium can include storage means, such as a ROM, for example a CD ROM or a microelectronic circuit ROM, or else a magnetic recording means, for example a mobile medium (memory card) or a hard drive or a SSD.

On the other hand, the information medium can be a transmissible medium such as an electrical or optical signal, which can be conveyed via an electrical or optical cable, by radio or by other means. The program according to the proposed technique can in particular be downloaded over an Internet type network.

Alternatively, the information medium can be an integrated circuit in which the program is incorporated, the circuit being adapted to execute or to be used in the execution of the method in question.

According to one embodiment, the proposed technique is implemented by means of software and/or hardware components. In this context, the term "module" can correspond in this document both to a software component, and to a hardware component or to a set of hardware and software components.

A software component corresponds to one or more computer program(s), one or more sub-program(s) of a program, or more generally to any element of a program or of a software capable of implementing a function or a set of functions, as described below for the concerned module. Such a software component is executed by a data processor of a physical entity (terminal, server, gateway, set-top-box, router, etc.) and is likely to access the hardware resources of this physical entity (memories, recording media, communication bus, electronic input/output cards, user interfaces, etc.).

Likewise, a hardware component corresponds to any element of a hardware set capable of implementing a function or a set of functions, as described below for the concerned module. It can be a programmable hardware component or with an integrated processor for executing a software, for example an integrated circuit, a smart card, a memory card, an electronic card for executing a firmware, etc.

The different embodiments mentioned above can be combined with each other for the implementation of the proposed technique.

4. LIST OF FIGURES

These features, as well as others, will emerge more clearly on reading the following description of an embodiment, given by way of simple illustrative and non-limiting example, and the appended figures, among which:

5. DESCRIPTION OF AN EMBODIMENT OF THE INVENTION

5.1. General Principle

The general principle of this technique is based on obtaining a user consent to the terms and conditions of use of a voice service in a fully voice manner.

To do this, the proposed technique is based on the use of one or more audio sample(s) of a user captured for his registration to a voice service, and more particularly for the learning step in order to create his reference voice print, to obtain his consent, instead of requiring a non-voice input (for example a click on a button of a web page) of the user.

Thus, when registering to a voice service, a user must create his voice print so that to be able to be authenticated when he wishes to access the voice service in question, for example a voice commerce service via which he can pay by voice.

In addition, before sharing any personal information/data (for example for the delivery of the product ordered in the context of a voice commerce service), he must accept the specific terms and conditions of the service in question.

Figure 1:
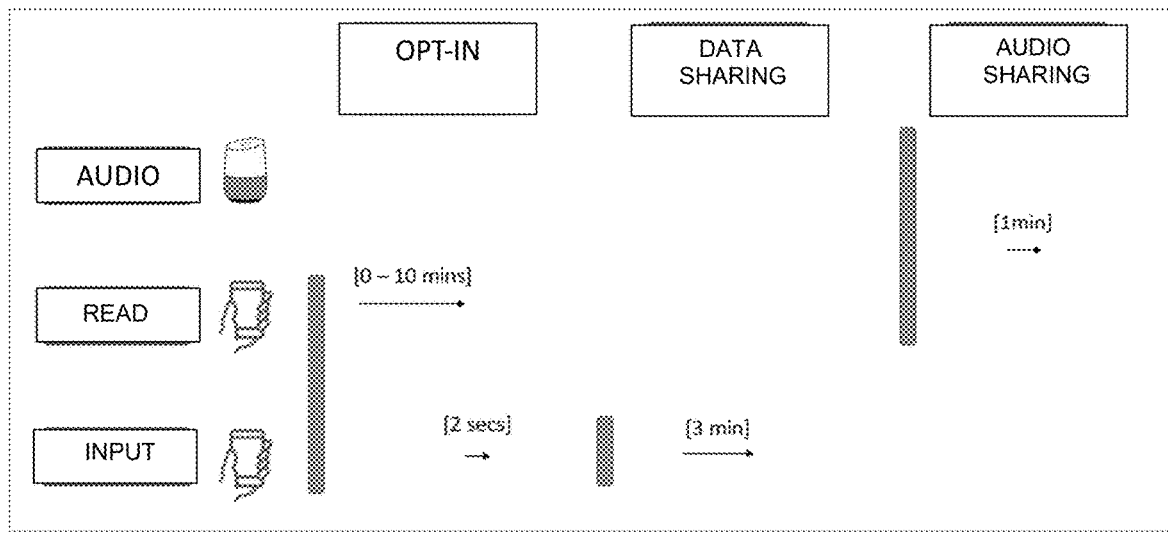
FIG. 1 illustrates an example of the conduct of a consent to a voice service according to the prior art.
Figure 2:
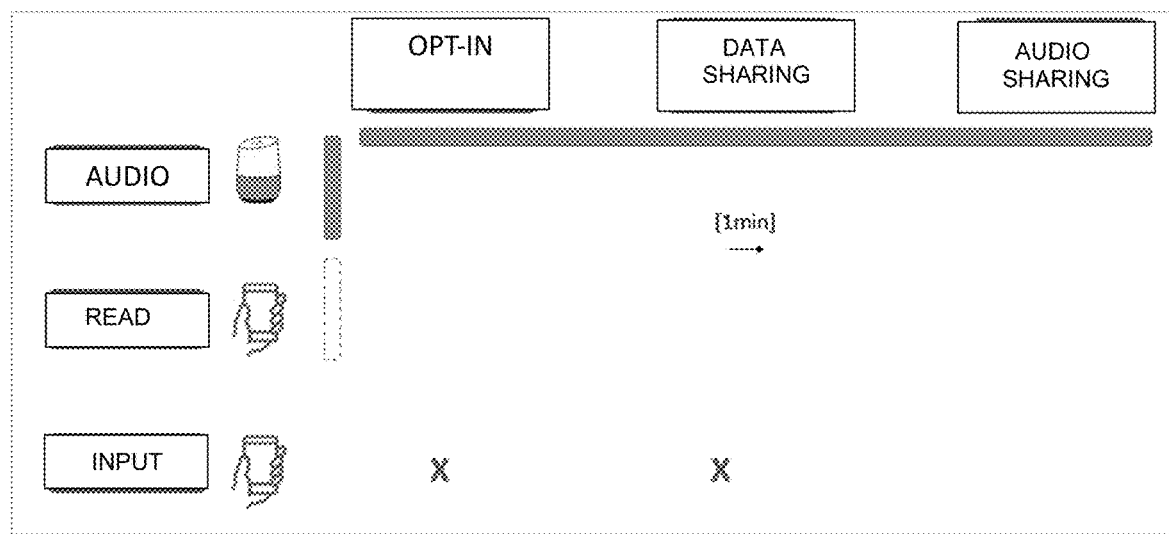
FIG. 2 illustrates an example of the conduct of a consent to a voice service according to an embodiment of the proposed technique.

This step, as already indicated above, constitutes a consent phase at the core of the present technique, as illustrated by [FIG. 2] described below.

Thus, during the voice service registration phase, the user will share a certain duration of audio (about one minute) so that the following three elements are collected at the same time:

audio samples of his voice for the subsequent computing of the user's reference voice print ("AUDIO SHARING");

personal data stated by the user, for example an address for the delivery of a purchased product, or an email address for sending an associated invoice or information by email "DATA SHARING";

the user's consent to the terms and conditions of use of the voice service ("OPT-IN").

The present technique therefore consists in combining the criteria required to finalize the user's registration, that is to say obtaining the three elements mentioned above only by capturing the user's voice, while making the user experience better.

For example, the user is made to repeat phrases like "My name is X and I agree to share my voice with Y" or "I agree to share my personal data to have access to the voice service of Y".

Then, the user is made to repeat the main aspects of the terms and conditions of the consent and to indicate that he accepts them. The user may, for example, after having taken the time to read them on his smartphone beforehand, or these main aspects may have been stated to him orally.

Finally, these audio samples of the user's voice constituting a sharing of his personal data and his consent, are also used to compute the user's reference voice print, without the latter having to repeat standard phrases or a password, as is the case in the solutions of the prior art which also require a repetition of these standard phrases or password for the authentication of the user at the time of his access to the concerned voice service.

Moreover, the architecture of the system of the present technique, described in more detail below in relation to [FIG. 4], ensures that there is no possibility of concurrent access to the recording of the user's audio samples and to the reference voice print associated therewith, so that no attacker cannot recreate voice prints from these audio recordings or cannot reassign voice prints to audio recordings. Thus, the security of registering a user to a voice service is ensured.

Finally, the proposed technique also allows keep both the user's reference voice print and the user's audio samples used to compute it. Therefore, these audio samples bearing the oral consent of the user to the terms and conditions of the voice service, they constitute a very strong evidence for the authentication of the user to which a consent is associated.

5.2. Description of an Embodiment

Figure 3:
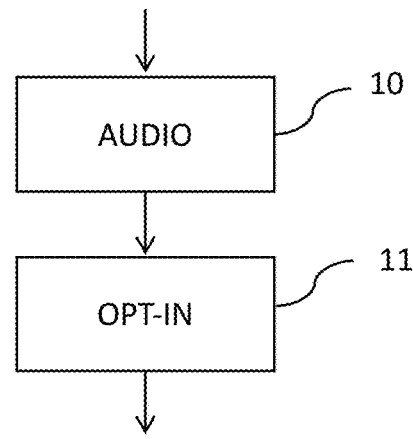
FIG. 3 illustrates the main steps of a consent to a voice service according to one embodiment of the proposed technique.
Figure 4:
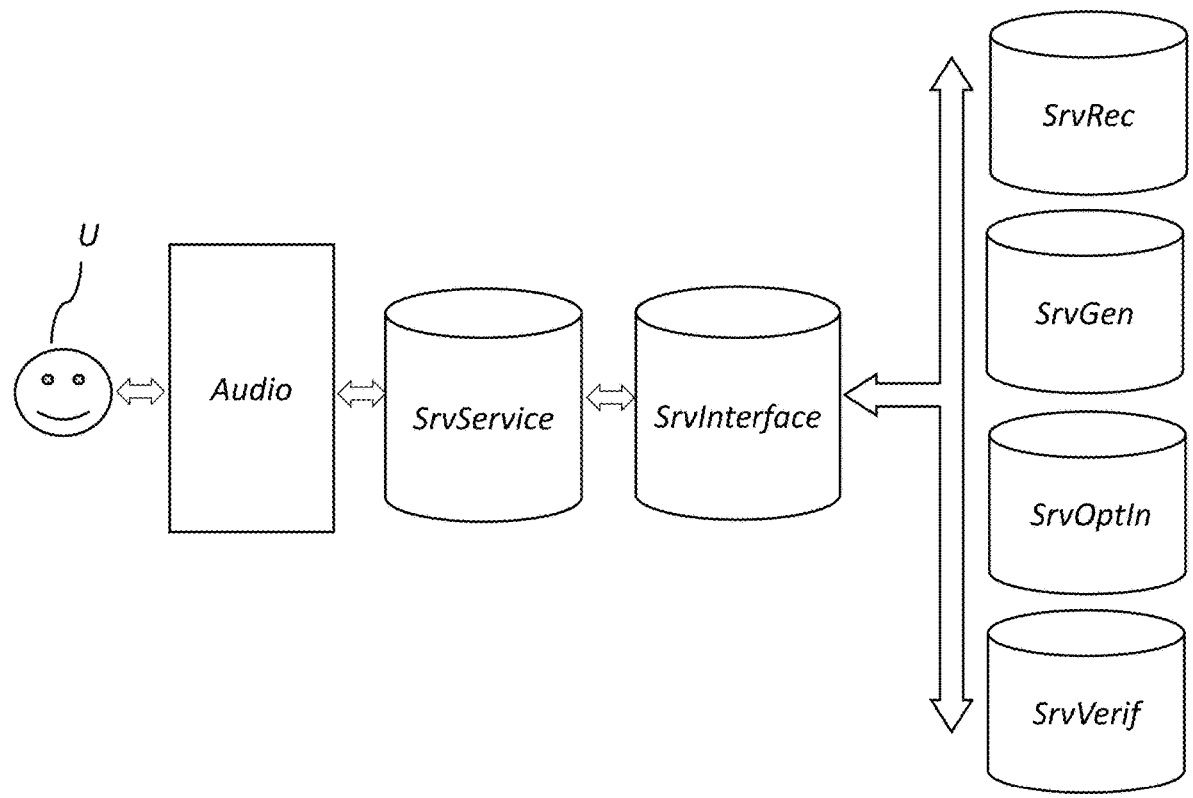
FIG. 4 illustrates an example of a system for implementing the proposed technique, according to one embodiment.

An embodiment of the proposed technique is now presented in more detail, in relation to [FIG. 3] and [FIG. 4].

The [FIG. 3] illustrates the main steps of the proposed technique, according to which at least one voice sample of the user wishing to register to a voice service is obtained, via an electronic voice processing device comprising at least one component for capturing audio samples. For example, such a voice processing device corresponds to a connected speaker or to a smartphone on which a voice assistant is installed. Such devices in fact include means for capturing, via a microphone for example, audio samples.

According to the proposed technique, the user is encouraged to state one or more phrase(s) representative of the terms and conditions of use of the voice service to which he wishes to register, or simply a phrase by which he indicates that he accepts the terms and conditions of use of the voice service. These phrases are therefore captured by the voice processing device and processed, according to the proposed technique, by an interface server, described in more detail below.

The first main step implemented by the interface server is therefore a step of obtaining 10, via the aforementioned voice processing device, of at least one voice sample of the user.

The second main step implemented by the interface server is a step of obtaining 11, from this or these voice sample(s) of the user, at least one information item for validating a consent of the user to the conditions for accessing the voice service. This step is more commonly called "opt-in" or consent.

According to the proposed technique, it is herein a matter of being able to ensure the user's consent solely based on vocal samples, that is to say by extracting from a recording of an audio sample at least one information item for validating a consent. This step is described in more detail below, in relation to [FIG. 4].

This [FIG. 4] illustrates an example of a system which can implement the proposed technique, and in particular the different modules or servers involved, as well as their inter-relationships.

An example of the conduct of a registration of a user to a voice service is therefore described below, as well as the devices implementing the different steps of this registration, according to the proposed technique.

When a user U wishes to register to a voice service, he issues a registration request to this service, via an electronic device Audio proposing the voice processing, such as a speaker or a smartphone.

This voice registration request is received by the voice processing device Audio and transmitted to a service server SrvService, for example a voice commerce server, to which the voice processing device Audio is connected, or paired.

The service server SrvService, in connection with an interface server SrvInterface, processes the voice registration request and delivers an interpretable textual registration request. This processing consists, for example, in applying an algorithm, known per se, for "Speech-To-Text" conversion in order to deliver a text representative of the speech spoken by the user U.

This interpretable textual registration request is then transmitted, via the interface server SrvInterface, to a user consent management module, corresponding for example to another server SrvOptIn.

The server SrvOptIn then supports this request and in particular transmits in return elements representative of the terms and conditions of use of the voice service required by the user U. These representative elements can be for example the complete content of the terms and conditions of use of the voice service, as well as one or more phrase(s) called key phrases corresponding to key elements of these terms and conditions of use. For example, these phrases will be repeated by the user U at the time of his voice registration, in order to implement the obtaining of his consent in a voice manner as well.

According to a first variant, it is possible to display the terms and conditions of use, as well as the key phrases on an electronic device associated with the user U, for example his smartphone or his computer, distinct from the voice processing device Audio. In this way, the user U can read aloud what is displayed on his smartphone so that it is captured by the voice processing device Audio.

According to a second variant, the voice processing device Audio first states the key phrases so that the user U repeats them aloud to capture them via the same voice processing device Audio.

In these two variants, after having issued a request for registering to a voice service, the user U receives in return, preferably always via the voice processing device Audio, the instructions for this registration, indicating him for example that he must repeat some phrases to accept the terms and conditions.

When the user U starts stating the phrases required to give his consent, via the voice processing device Audio, his voice is therefore captured and transmitted, via the service server SrvService, to the previously mentioned interface server SrvInterface. The latter implements the steps below, in relation to a plurality of modules, for example implemented by distinct servers, for security reasons detailed below.

A first step therefore consists in saving, in a backup module or server SrvRec, the voice samples captured by the voice processing device Audio. The interface server SrvInterface is used to recover the audio/voice samples from the voice processing device Audio and transmit them to the backup server SrvRec.

A second step consists in being ensured that the voice samples captured by the voice processing device Audio allow obtaining the consent of the user U to the terms and conditions of use of the voice service. For example, this step is implemented by a biometric verification module or server SrvVerif which receives the voice samples or the transcription thereof into interpretable text in order to process them. If the result of this verification is negative, that is to say that the consent of the user U is not obtained, the vocal samples which are previously or in parallel saved by the server SrvRec are erased and the registration procedure is proposed again to the user U.

However, if the user's consent is obtained, the registration procedure continues in order to implement the voice learning which allows computing a reference voice print of the user U for his subsequent authentication when he wishes to access the voice service to which he has registered.

A third step, which can be implemented by a module or server for generating voice prints SrvGen, in parallel with the first step and/or the second step, consists in computing, from at least one audio/voice sample captured by the voice processing device Audio, at least one reference voice print associated with the user U. Again, the interface server SrvInterface is used to recover the audio/voice samples and transmit them to the voice print generation server SrvGen. This voice print generation is implemented by algorithms known per se and is not detailed herein.

A fourth step consists in validating that the generated reference voice print complies with the requirements of the user authentication method, at the time of using the voice service. Indeed, the authentication of the user U to authorise him to use a voice service with which he has registered, consists in comparing a voice print computed from an audio sample captured during the use of the voice service and the reference voice print generated at the time of his registration to the voice service. The reference voice print must therefore be of sufficient quality to be able to be used for authenticating the user U when the time comes. This fourth step of verifying or validating the reference voice print is for example implemented in the aforementioned verification module or server SrvVerif. Thus, the latter receives from the interface server SrvInterface, the previously generated reference voice print, as well as voice samples of the user U captured by the voice processing device Audio used to be able to test that the previously generated reference voice print allows authenticating the user U from captured voice samples.

A fifth step, which can be implemented in parallel with the steps described above, consists in obtaining personal data from the user U, in order to use the voice service. Thus, in the same manner that the user U orally states his consent to the voice processing device Audio, the user U is invited to orally provide the personal data required. Like all voice samples captured by the voice processing device Audio, the sample(s) comprising the user's personal data are transmitted by this voice processing device Audio to the interface server SrvInterface, to be recorded (for the purposes of subsequent evidence) by the backup server SrvRec and processed in order to recover usable personal data of the user U.

It should be noted that this personal data can be stated by the user U at the same time as the consent, for example if he starts a phrase by indicating his contact information: "My name is X, domiciled in AAA, and I accept the terms and conditions of use of the service S. I also agree to share my personal data with the service S."

Thus, at the end of these different steps, and by using only voice samples of the user U captured by a voice processing device Audio, the proposed technique allows obtaining:
- the voice consent of the user U to the terms and conditions of use of the voice service;
- personal data of the user U which are necessary for the use of the voice service, and which the user U has agreed to share;
- a reference voice print of the user U to then be able to authenticate him at the time of accessing and using the voice service to which he has registered.

As indicated above, the proposed technique also allows providing an enhanced security to the method for registering a user to a voice service. Indeed, when personal data and biometric data of a user are saved for his authentication, this data must be protected so as not to be fraudulently used in order to impersonate this user. The distribution, on different modules or servers, of the different data/information used in the steps detailed above, allows obtaining an optimal level of security, by preventing concurrent accesses to distinct but associated data (such as for example an audio recording and the biometric/voice print computed from this audio recording) from being made.

Finally, the proposed technique allows offering a very great improvement in terms of consent of a user to the terms and conditions of use of a voice service, an improvement based on the following aspects, obtained thanks to the different steps and the different technical elements described above:
- a trace of the user's voice/audio recording is saved, as a reference recording, so that this recording can be legally referred to as a strong evidence of the user's consent. Thus, in case of dispute on the user's consent, it is possible to prove the authenticity of a consent from an audio recording of his voice, whose interpretable content constitutes the consent and whose biometric analysis allows the authentication of the user;
- a biometric analysis is applied to the reference voice recording and stored with the voice print. This biometric analysis allows, for example, to ensure the reliability of the user's authentication, by testing the reference voice print generated with test phrases stated by the user. For example, if the voice service is a deliverable pizza ordering service, the biometric analysis consists in testing pizza order standard phrases with the generated reference voice print. This biometric analysis can be recomputed at any time as evidence of validating the reliability of the reference voice print, including when using the voice service by the user. This thereby allows updating the reference voice print if necessary, for example if the user's voice changes too much, because he is ill for example. In this case, if the biometric voice verification detects a too large difference with the reference voice recording, it is possible to ask the user to register again in order to renew both the reference voice recording and the reference voice print.

5.3. Other Technical Features and Advantages

The modules or servers described above can concretely take the form of a physical server and/or a set of servers distributed in a decentralised processing infrastructure of the "cloud" type. The server SrvInterface is itself connected to one or several server(s) offering complementary functions: for example, a merchant server SrvService, a recording server SrvRec, a voice print generation server SrvGen, a consent server SrvOptIn, a biometric verification server SrvVerif, etc.). A communication terminal, for example a smartphone can also be connected to a communication network and to the same interface server SrvInterface as that of the voice processing device Audio.

Such means may be in the form of dedicated processors or secure processors, specifically dedicated to the implementation of these user authentication operations.

The invention claimed is:
1. A method comprising:
creating an account of a user to a voice service, which is implemented by an interface server and comprises:
obtaining, via an electronic voice processing device comprising at least one component for capturing audio samples, at least one voice sample of said user;
processing said at least one voice sample of said user delivering at least one interpretable textual information item;
interpreting said at least one interpretable textual information item delivering at least one information item for validating a consent of said user to terms and conditions of use of said voice service, wherein said information item for validating the consent of said user to terms and conditions of use of said voice service is one or more phrase(s) representative of the terms and conditions of use of said voice service, or a phrase by which the user indicates that the user accepts the terms and conditions of use of said voice service, which is not a personal data item associated with the user, in order to determine whether the user's consent if obtained;
obtaining, from said at least one voice sample of said user, at least one personal data item associated with said user, which is distinct from the at least one information item for validating the consent of said user;
if said user's consent is determined as obtained,
computing, from said at least one voice sample of said user, a reference voice print associated with said user; and
delivering a registration of said user to said voice service implemented only in a voice manner from said at least one personal data item associated with said user, obtained from said at least one voice sample of said user; and
if said user's consent is determined as not obtained, erasing the voice sample.

2. The registration method according to claim 1, wherein said at least one voice sample, from which said least one information item for validating the consent of said user is obtained, is associated with said user and saved as evidence of said consent of said user.

3. The registration method according to claim 1, wherein the method comprises verifying reliability of said reference voice print with at least one second voice sample of said user.

4. An interface server comprising:
a processor; and
a non-transitory computer-readable medium comprising program code instructions stored thereon which when executed by the processor configure the interface server to create an account of a user to a voice service by:
obtaining, via an electronic voice processing device comprising at least one component for capturing audio samples, at least one voice sample of the user;
processing said at least one voice sample of said user delivering at least one interpretable textual information item;
interpreting said at least one interpretable textual information item delivering at least one information item for validating a consent of said user to terms and conditions of use of said voice service, wherein said information item for validating the consent of said user to terms and conditions of use of said voice service is one or more phrase(s) representative of the terms and conditions of use of said voice service, or a phrase by which the user indicates that the user accepts the terms and conditions of use of said voice service, which is not a personal data item associated with the user, in order to determine whether the user's consent if obtained;
obtaining, from said at least one voice sample of said user, at least one personal data item associated with said user, which is distinct from the at least one information item for validating the consent of said user;
if said user's consent is determined as obtained,
computing, from said at least one voice sample of said user, a reference voice print associated with said user; and
delivering a registration of said user to said voice service implemented only in a voice manner from said at least one personal data item associated with said user, obtained from said at least one voice sample of said user; and
if said user's consent is determined as not obtained, erasing the voice sample.

5. A non-transitory computer-readable medium comprising program code instructions stored thereon which when executed by a processor of an interface server configure the interface server to create an account of a user to a voice service by:
obtaining, via an electronic voice processing device comprising at least one component for capturing audio samples, at least one voice sample of a user;
processing said at least one voice sample of said user delivering at least one interpretable textual information item;
interpreting said at least one interpretable textual information item delivering at least one information item for validating a consent of said user to terms and conditions of use of said voice service, wherein said information item for validating the consent of said user to terms and conditions of use of said voice service is one or more phrase(s) representative of the terms and conditions of use of said voice service, or a phrase by which the user indicates that the user accepts the terms and conditions of use of said voice service, which is not a personal data item associated with the user, in order to determine whether the user's consent if obtained;
obtaining, from said at least one voice sample of said user, at least one personal data item associated with said user, which is distinct from the at least one information item for validating the consent of said user;
if said user's consent is determined as obtained,
computing, from said at least one voice sample of said user, a reference voice print associated with said user; and
delivering a registration of said user to said voice service implemented only in a voice manner from said at least one personal data item associated with said user, obtained from said at least one voice sample of said user; and
if said user's consent is determined as not obtained, erasing the voice sample.

* * * * *